United States Patent
Velke et al.

[11] Patent Number: 6,094,897
[45] Date of Patent: Aug. 1, 2000

[54] POWER MOWER WITH RIDING PLATFORM FOR SUPPORTING STANDING OPERATOR

[75] Inventors: James D. Velke, Poolesville; William R. Wright, Clarksburg, both of Md.

[73] Assignee: Wright Manufacturing, Inc., Gaithersburg, Md.

[21] Appl. No.: 09/426,746

[22] Filed: Oct. 26, 1999

Related U.S. Application Data

[62] Division of application No. 09/054,460, Apr. 3, 1998, which is a division of application No. 08/827,455, Mar. 28, 1997, Pat. No. 5,809,755, which is a continuation-in-part of application No. 08/726,927, Oct. 3, 1996, abandoned, which is a continuation of application No. 08/615,518, Mar. 11, 1996, Pat. No. 5,600,944, which is a continuation of application No. 08/357,740, Dec. 16, 1994, Pat. No. 5,507,138.

[51] Int. Cl.$^7$ .................................................. A01D 34/82
[52] U.S. Cl. ........................... 56/14.7; 56/16.7; 56/17.4; 56/DIG. 20; 180/6.48
[58] Field of Search ..................... 56/14.7, 16.7, 56/17.4, 17.5, 10.1, DIG. 20; 180/6.48, 6.5, 6.62

[56] References Cited

U.S. PATENT DOCUMENTS

| | | |
|---|---|---|
| Re. 34,057 | 9/1992 | Middlesworth . |
| 1,764,971 | 6/1930 | Nilson . |
| 2,354,576 | 7/1944 | Clark . |
| 2,583,358 | 1/1952 | Cesan . |
| 3,190,672 | 6/1965 | Swanson et al. . |
| 3,336,042 | 8/1967 | Southall . |
| 3,455,404 | 7/1969 | Hansen . |
| 3,483,682 | 12/1969 | Root . |
| 3,485,314 | 12/1969 | Herr . |
| 4,175,762 | 11/1979 | Vaughn et al. . |
| 4,316,356 | 2/1982 | Planeta . |
| 4,487,006 | 12/1984 | Scag . |
| 4,558,558 | 12/1985 | Horner, Jr. et al. . |
| 4,709,541 | 12/1987 | Broman et al. . |
| 4,715,168 | 12/1987 | Oxley . |
| 4,787,646 | 11/1988 | Kamlukin et al. . |
| 4,828,282 | 5/1989 | Pinto . |
| 4,874,055 | 10/1989 | Beer . |
| 4,878,339 | 11/1989 | Marier et al. . |
| 4,885,903 | 12/1989 | Scag . |
| 4,920,733 | 5/1990 | Berrios . |
| 4,967,543 | 11/1990 | Scag et al. . |
| 4,991,382 | 2/1991 | Scag . |
| 4,998,948 | 3/1991 | Osterling . |
| 5,004,251 | 4/1991 | Velke et al. . |
| 5,042,238 | 8/1991 | White, III et al. . |

(List continued on next page.)

FOREIGN PATENT DOCUMENTS 597049  4/1993  Japan .

OTHER PUBLICATIONS

Great Dane "Surfer", Yard and Garden, Jan. 1997.
Excel Compacts 251K/251K T/S/260K T/S (1990).
Excel Hustler 261 (1983).
Excel Hustler 65 and Hustler 36 (1965).

*Primary Examiner*—H. Shackelford
*Attorney, Agent, or Firm*—Nixon & Vanderhye P.C.

[57] ABSTRACT

A zero turning radius power lawn mower for operation by a standing occupant includes first and second independently driven and controlled rear drive wheels mounted on separate drive axles. A riding platform for supporting the standing occupant or operator is located between the first and second rear drive wheels. The rear drive wheels are independently driveable in both the forward and reverse directions at variable speeds so as to allow for substantially zero radius turning of the mower about a central turning point. The riding platform is positioned near this turning point or axis so that the standing occupant remains substantially unaffected by centrifugal force created during approximate zero radius turning of the mower thereby allowing the mower to take such turns at higher speeds. The low center of gravity created by the position of the riding platform for the standing operator also results in the mower having improved traction and being less likely to pop "wheelies" upon acceleration.

4 Claims, 10 Drawing Sheets

U.S. PATENT DOCUMENTS

| | | |
|---|---|---|
| 5,077,959 | 1/1992 | Wenzel . |
| 5,118,123 | 6/1992 | Betrock . |
| 5,119,619 | 6/1992 | Zappia . |
| 5,131,483 | 7/1992 | Parkes . |
| 5,375,674 | 12/1994 | Peter . |
| 5,388,850 | 2/1995 | Simone . |
| 5,413,364 | 5/1995 | Hafendorfer . |
| 5,507,138 | 4/1996 | Wright et al. . |
| 5,600,944 | 2/1997 | Wright . |
| 5,653,466 | 8/1997 | Berrios . |
| 5,765,347 | 6/1998 | Wright et al. .......................... 56/14.7 |
| 5,809,755 | 9/1998 | Velke et al. . |
| 5,809,756 | 9/1998 | Scag et al. . |

POWER MOWER WITH RIDING PLATFORM FOR SUPPORTING STANDING OPERATOR

This is a division of application Ser. No(s). 09/054,460 filed Apr. 3, 1998; which is a divisional of Ser. No. 08/827, 455 filed on Mar. 28, 1997. (U.S. Pat. No. 5,809,755); which is a CIP of Ser. No. 08/726,927 filed on Oct. 3, 1996; which is a continuation of Ser. No. 08/615,518 filed Mar. 11, 1996 (U.S. Pat. No. 5,600,944); which is a continuation of Ser. No. 08/357,740, filed on Dec. 16, 1994 (U.S. Pat. No. 5,507,138) which are all incorporated herein by reference.

The instant application is a continuation-in-part (CIP) of U.S. Ser. No. 08/726,927 (filed Oct. 3, 1996) which is a continuation of U.S. Ser. No. 08/615,518 (filed Mar. 11, 1996, now U.S. Pat. No. 5,600,944), which is a continuation of U.S. Ser. No. 08/357,740 (filed Dec. 16, 1994, now U.S. Pat. No. 5,507,138), the disclosures of which are all hereby incorporated herein by reference.

This invention relates to a power driven device. More particularly, this invention relates to a power lawn mower including a riding platform for supporting a standing operator.

BACKGROUND OF THE INVENTION

Conventional hydraulically driven or hydrostatically controlled machines such as power lawn mowers include a pair of drive wheels, each of which is independently operated by a hydraulic or hydrostatic pump coupled to the mower's engine. A corresponding motor is provided for each drive wheel, each motor being powered by one of the pumps. Each pump includes a control lever for regulating fluid pressure and direction to its corresponding motor. In such a manner the drive wheels of the power device (e.g. lawn mower) are independently controlled so that each may be rotated at variable speeds in both forward and reverse directions.

Accordingly, each drive wheel of hydrostatically controlled mowers may be driven in either the forward or reverse direction and the mower may therefore be turned through various angles. Hand levers for manipulation by the operator on such mowers are typically provided on handle members for moving the individual pump control levers into desired positions. The above described power lawn mowers are commonly referred to as zero turning radius mowers because if operated in a particular or predetermined manner, the right drive wheel and left drive wheel may be rotated in opposite directions at similar speeds thereby allowing the mower to conduct approximate zero radius turns about a central axis or point located between the drive wheels. This, of course, provides for improved maneuverability in tight environments. Exemplary zero turning radius mowers are disclosed, for example, in U.S. Pat. Nos. 5,077,959; 4,967, 543; 4,991,382; and 4,920,733.

Conventional power mowers are generally divided into three separate categories: (i) self-propelled walk-behind mowers; (ii) mowers operated by a seated occupant; and (iii) mowers operated by a standing occupant.

U.S. Pat. Nos. 5,077,959; 4,967,543; 4,991,382 and 4,920,733 disclose typical walk-behind power mowers including hydrostatically or hydraulically controlled rear drive wheels. Unfortunately, the operator of walk-behind mowers such as these is forced to continually walk during mowing operations, thereby leading to fatigue. This is, of course, a disadvantage associated with walk-behind mowers, especially in hilly environments. As a result of operator fatigue, mowers controlled by walking operators are generally less productive over extended periods of time. A further disadvantage of walk-behind mowers is that the operator's feet are left unprotected and thus exposed to potentially dangerous flying debris.

Turning now to power mowers operated by seated occupants, U.S. Pat. Nos. 3,483,682; 4,487,006; 4,316,356; and 4,998,948 disclose typical such mowers. Unfortunately, seated occupant operated mowers tend to have fairly high centers of gravity (i.e. they are top heavy) due to the position of the operator's center of gravity which is far from the ground. Such high centers of gravity render mowers operated by seated occupants more likely to tip or roll. Because tipping and rolling is more likely to occur as such mowers operate through turns or on hills, seated operators must be very careful in such environments and work at reduced speed. Operation at reduced speeds clearly leads to reduced productivity of the mower. Additionally, seated operators have a hard time ducking under low hanging tree limbs and the like because of the fixed position of the seat and thus the lower half of the operator's body. Furthermore, seat assemblies on such mowers necessarily increase the overall cost of the mowers.

U.S. Pat. Nos. 2,354,576; 3,485,314 and 5,004,251 disclose power devices operated by standing occupants supported on trailers or sulkies. The operators of these devices (e.g. power mowers) are supported on sulky devices or trailers removably attached to the mower. Thus, the standing operator supporting trailing platforms of these patents are not actually part of the mower, but rather are mower attachments which must be removed or folded up during mower transport. While the trailing platforms or sulky devices of U.S. Pat. No. 2,354,576 and 5,004,251 provide for mower operation by a standing occupant, they greatly extend the overall length of the mower system and are rather bulky in nature. Thus, the sulky or standing occupant platforms of these patents must be disconnected or folded up during transport of the mower. This is burdensome and inconvenient. A further problem with removable trailing platforms such as those disclosed in U.S. Pat. Nos. 5,004, 251 and 2,354,576 is that they significantly extend the length of the mower thereby decreasing maneuverability in tight spaces. Additionally, because these sulky or attachment devices are not actually part of the mower, they must often be purchased separately thus increasing the overall cost of the mower system.

U.S. Pat. No. 4,878,339 discloses a power lawn mower including a selectively deployable riding platform for supporting a standing operator or occupant. The mower of U.S. Pat. No. 4,878,339 may be operated either as a walk-behind mower or alternatively as a standing occupant/operator mower depending upon whether or not the standing operator platform is deployed. In other words, because the platform is selectively deployable it is non-fixedly mounted to the mower. Unfortunately, in the walk-behind mode, this mower experiences the above-referenced problems associated with typical walk-behind mowers.

In the standing operator mode (i.e. when the riding platform is deployed), the power mower of U.S. Pat. No. 4,878,339 experiences numerous problems. Firstly, the position of the riding platform lengthens the overall length of the mower and renders it difficult to maneuver in tight areas. Furthermore, while the platform of this patent provides for a fairly low center of gravity, its location well behind the rear drive wheel axis and extension substantially behind the rear drive wheels renders it more likely to bottom out or contact the ground when the mower goes over curbs, bumps, or the like.

If the power mower of U.S. Pat. No. 4,878,339 were operated so as to conduct a substantially zero radius turn, the rear drive wheels would be operated in opposite directions at similar speeds and the central turning point would be located between the rear wheels along the rear drive wheel axis. Because the standing occupant platform of the mower of the '339 patent is not located at or near this central turning axis (i.e. the platform is located well behind the rear drive wheel axis in the standing operator mode), the operator is adversely affected by centrifugal force created during approximate zero radius turns of the mower. The standing operator is also more affected by centrifugal force created during other mower turns. Due to this centrifugal force, the standing operator or occupant of the mower of the '339 patent is forced to take turns at slower speeds thus reducing the overall productivity of the mower over extended periods of time.

Another problem with the position of the platform of the U.S. Pat. No. 4,878,339 mower is that its location creates a greater tendency for the mower to "pop wheelies" upon acceleration, especially going up hills, because the mower's center of gravity is moved rearward when it is operated by a standing occupant. The position of the platform of this patent often necessitates the standing operator leaning forward prior to and during acceleration in order to avoid popping such wheelies and possibly tipping over the mower.

It is apparent from the above, that there exists a need in the art for a power lawn mower operable by a standing occupant including a platform for supporting the standing occupant, the platform being positioned on the mower so as to result in the following advantages: (i) a low mower center of gravity resulting in improved drive wheel traction and less susceptibility to tipping or rolling; (ii) a lessened overall length of the mower so as to render it highly maneuverable in tight spaces and environments; (iii) a reduced tendency of the standing operator platform to bottom out or contact the ground when the mower goes over curbs, bumps, or the like; (iv) a platform positioned in a zero turning radius mower such that the operator is substantially unaffected by centrifugal force created during approximate zero radius turns, thereby allowing the operator/mower to take such turns at higher speeds; (v) a platform positioned in a manner such that the mower is less likely to pop wheelies upon acceleration; etc. Each of the above advantages is accomplished by positioning the standing operator platform of the mower substantially between the rear drive wheels.

It is the purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing a zero turning radius power mower for operation by a standing occupant, comprising:

an engine;

at least one cutting member powered by the engine;

first and second rear drive wheels each independently driveable in both forward and reverse directions so as to allow for substantially zero radius turning of the mower about a turning point when the rear drive wheels are driven in a predetermined manner; and a riding platform for supporting the standing occupant, the riding platform being located close enough to the turning point or axis so that the standing occupant is substantially unaffected by centrifugal force created during zero radius turning of the mower.

This invention further fulfills the above-described needs in the art by providing a power mower for operation by a standing occupant, comprising:

an engine for driving a cutting member;

first and second rear drive wheels each rotatable about a common axis;

a riding platform mounted on the mower for supporting the standing occupant, the platform being located between the first and second rear drive wheels during operation of the mower so that when the standing occupant stands on the platform the standing occupant is between the first and second rear drive wheels at or near the axis, whereby the platform is less susceptible to impacting the ground when going over bumps and the like.

It is an object of this invention to provide a zero radius turning mower for use by a standing occupant, wherein the occupant's foot platform extends forward of and underneath a frame (e.g. deck) section of the mower so as to protect the occupant's feet from injury and conserve valued space.

It is another object of this invention to provide a unique handle bar and control configuration for use with such a mower for the purpose of enabling the standing occupant to more easily operate the mower in forward and reverse without losing his/her balance during the process of doing so.

It is still another object of this invention to provide front and side standing occupant thigh rests so that the standing occupant can rest his/her thighs against same during mower operation. In certain preferred embodiments, the hydraulic fluid tank is housed within a portion of this thigh rest structure and an air cooling passage is designed to flow proximate same in order to help maintain the hydraulic fluid tank or reservoir at acceptable temperature(s).

It is still another object of this invention to provide a pump control lockout system for preventing accidental movement of the mower while the parking brake is engaged. Furthermore, according to certain embodiments, a wheelie bar member(s) is/are mounted to the rear of the mower in order to reduce the possibility of extreme backward tipping of the mower when going up hills and the like.

Another object of this invention is to provide a deadman switch (i.e. or operator presence control switch) that functions to stop cutting blade rotation beneath the mower deck in response to the operator stepping off of the foot platform.

It is still another object of this invention to fulfill the above-described needs in the art by providing a zero turning radius self-propelled power mower for operation by a standing occupant, the self-propelled mower comprising:

an engine;

at least one cutting member powered by said engine;

first and second rear drive wheels each independently drivable in both forward and reverse directions so as to allow for substantially zero radius turning of the mower about a turning axis when said rear drive wheels are driven in a predetermined manner, said turning axis being located between said rear drive wheels, and wherein each of said first and second rear drive wheels is rotatable about corresponding axles;

a first hydrostatically powered means connected to said first drive wheel and a second hydrostatically powered means connected to said second drive wheel, said first and second hydrostatically powered means each being positioned proximate the axle of a corresponding wheel so that said first and second means drive said first and second rear drive wheels, respectively, via their axles, said first and second means for driving said rear wheels being located on opposite sides of said turning axis;

a mower deck for housing said at least one cutting member, at least a substantial portion of said mower deck and cutting member being located substantially forward of said first and second rear drive wheels;

a handle member including a hand grip portion, said hand grip portion located forward of said turning axis so that hands of the standing occupant are normally located forward of said turning axis during zero radius turns of the mower;

a foot platform for supporting the standing occupant, wherein said foot platform is located at a position relative to said hand grip portion and said turning axis so that a substantial portion of the standing occupant's body may be located substantially on said turning axis during zero radius turns of the mower and thus be substantially unaffected by centrifugal force created during zero radius turns of the mower; and wherein a substantial portion of said foot platform is located at an elevation below or substantially near an axis of at least one of said rear drive wheels (or within the side profile of at least one of the rear drive wheels) so as to create a low center of gravity of the mower.

This invention will now be described with respect to certain embodiments thereof, accompanied by certain illustrations, wherein:

IN THE DRAWINGS

Figure 6:
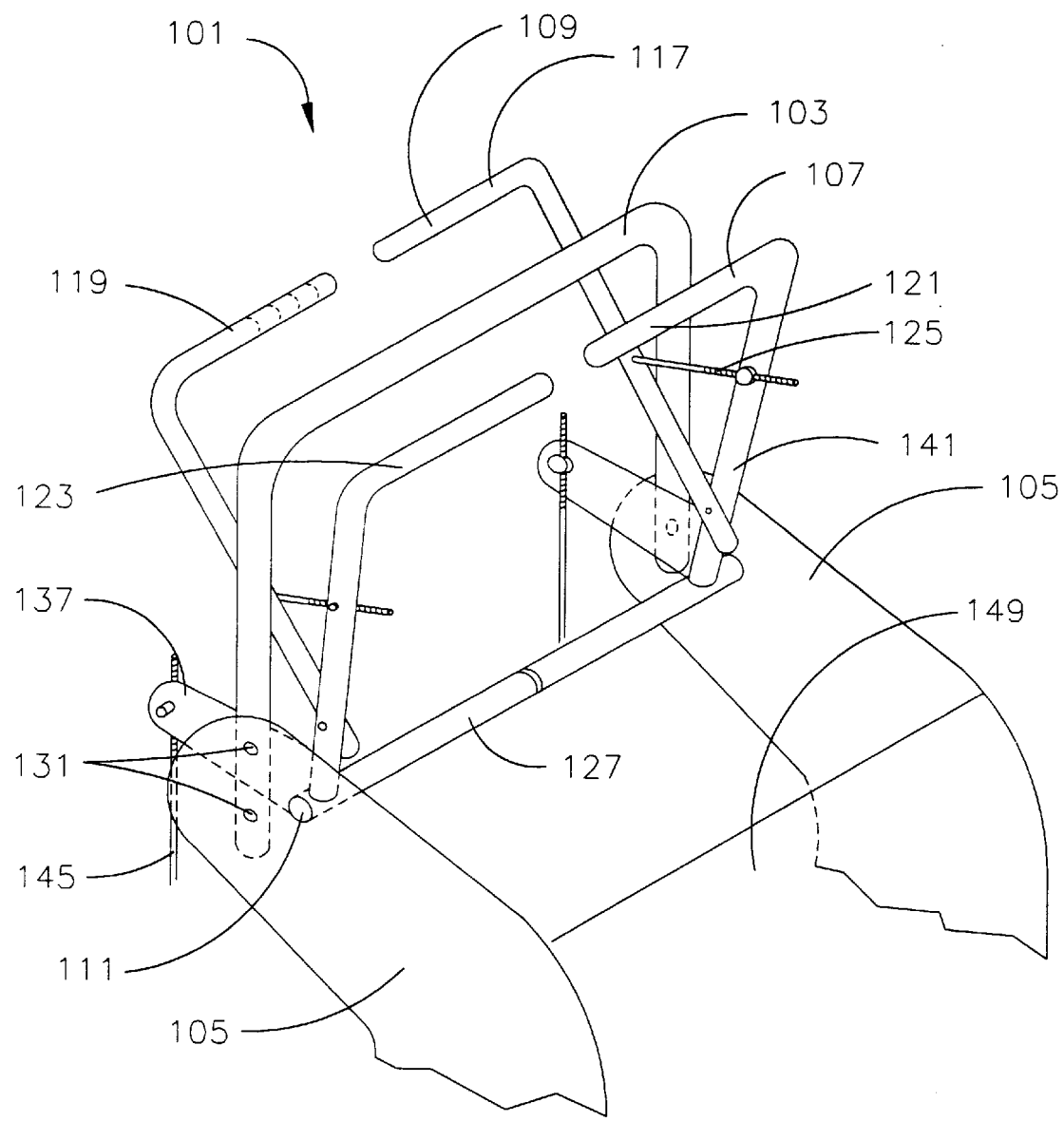
FIG. 6 is a perspective view illustrating a handle configuration for use with the zero radius turning mower of any of FIGS. 1–4.
Figure 7:
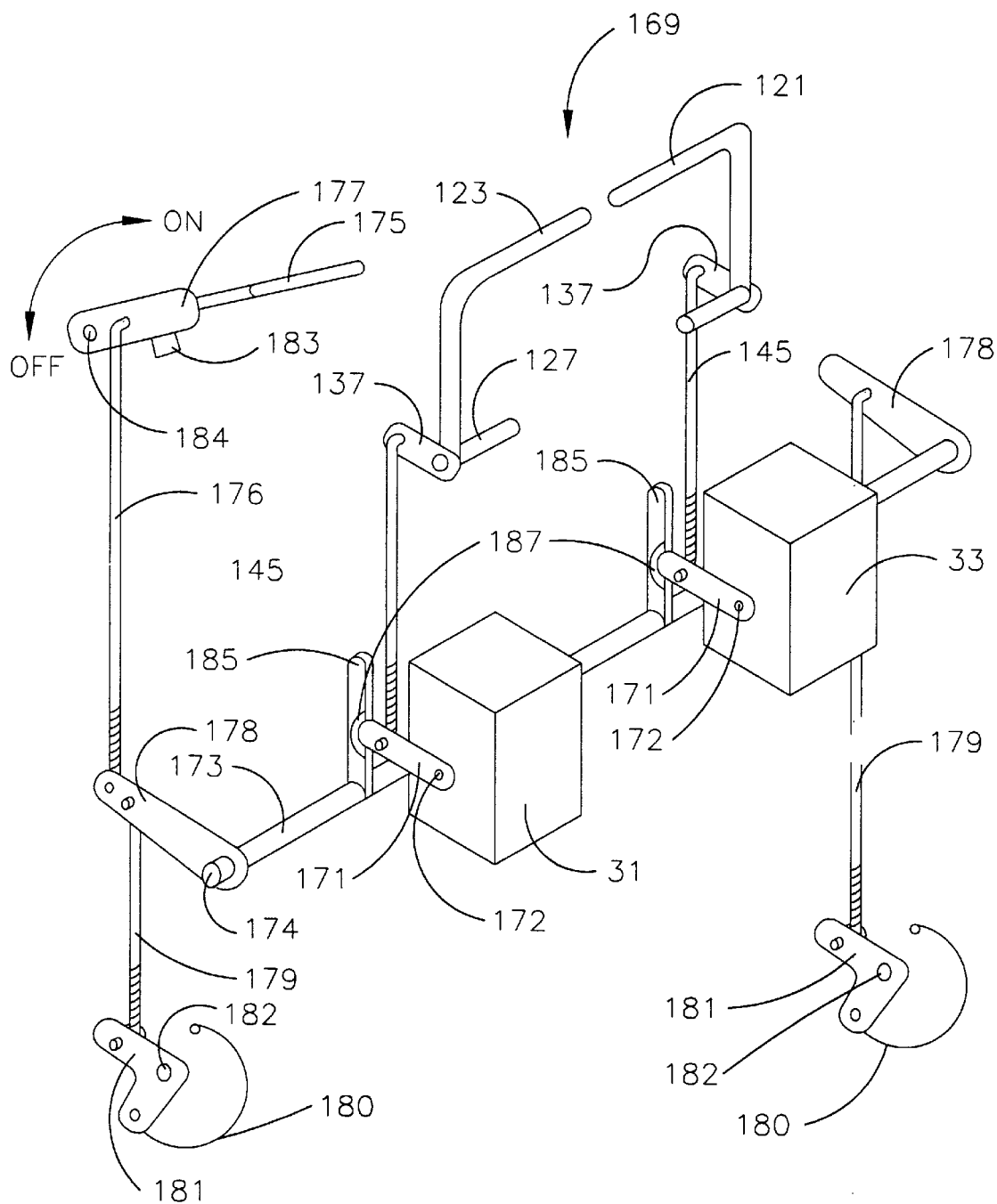
FIG. 7 is a schematic perspective view illustrating a pump control lockout and braking system for use with the zero radius turning mower of any of FIGS. 1–6.
Figure 8B:
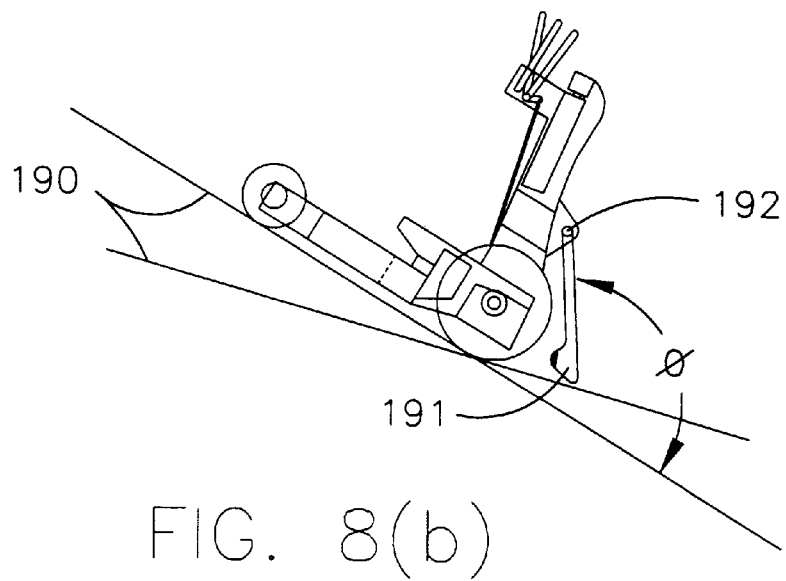
Figure 8A:
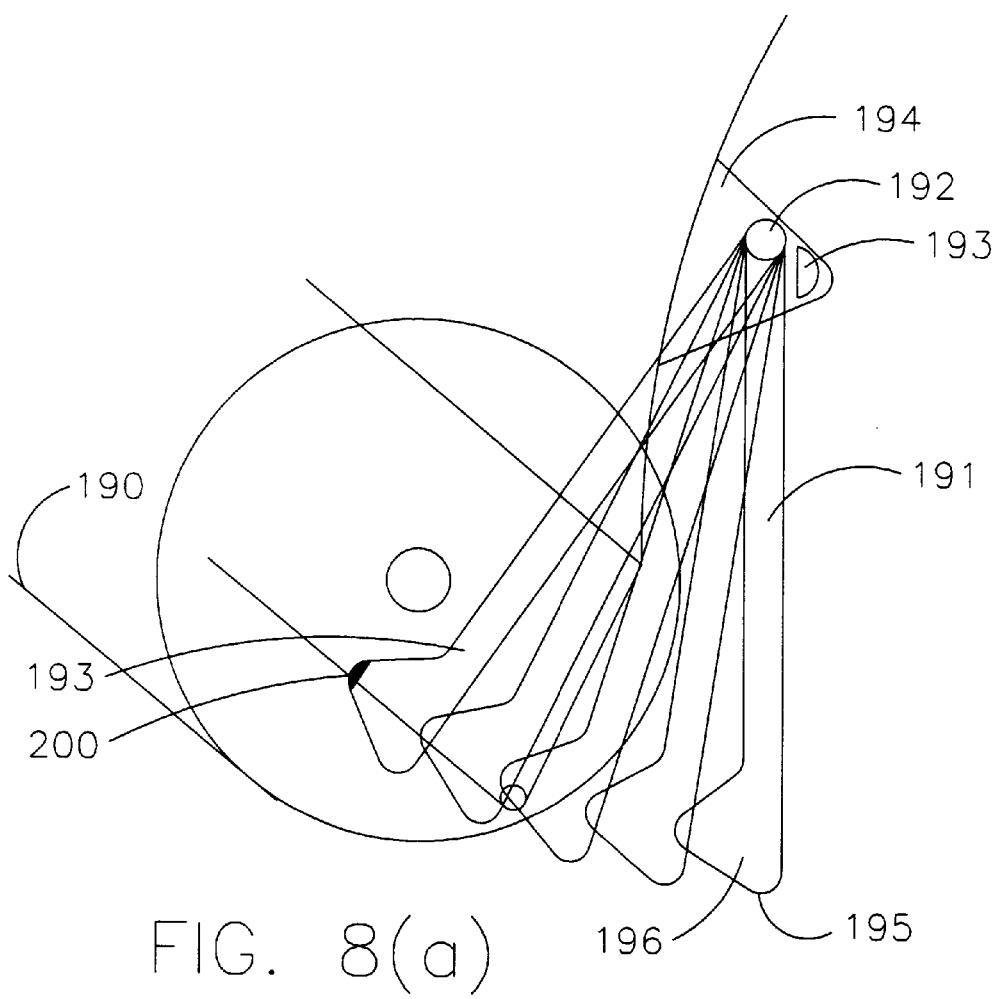

FIGS. 8(a) and 8(b) are side elevational views illustrating a wheelie bar to be used in conjunction with the zero radius power turning mower of any of FIGS. 1–7.

Figure 9:
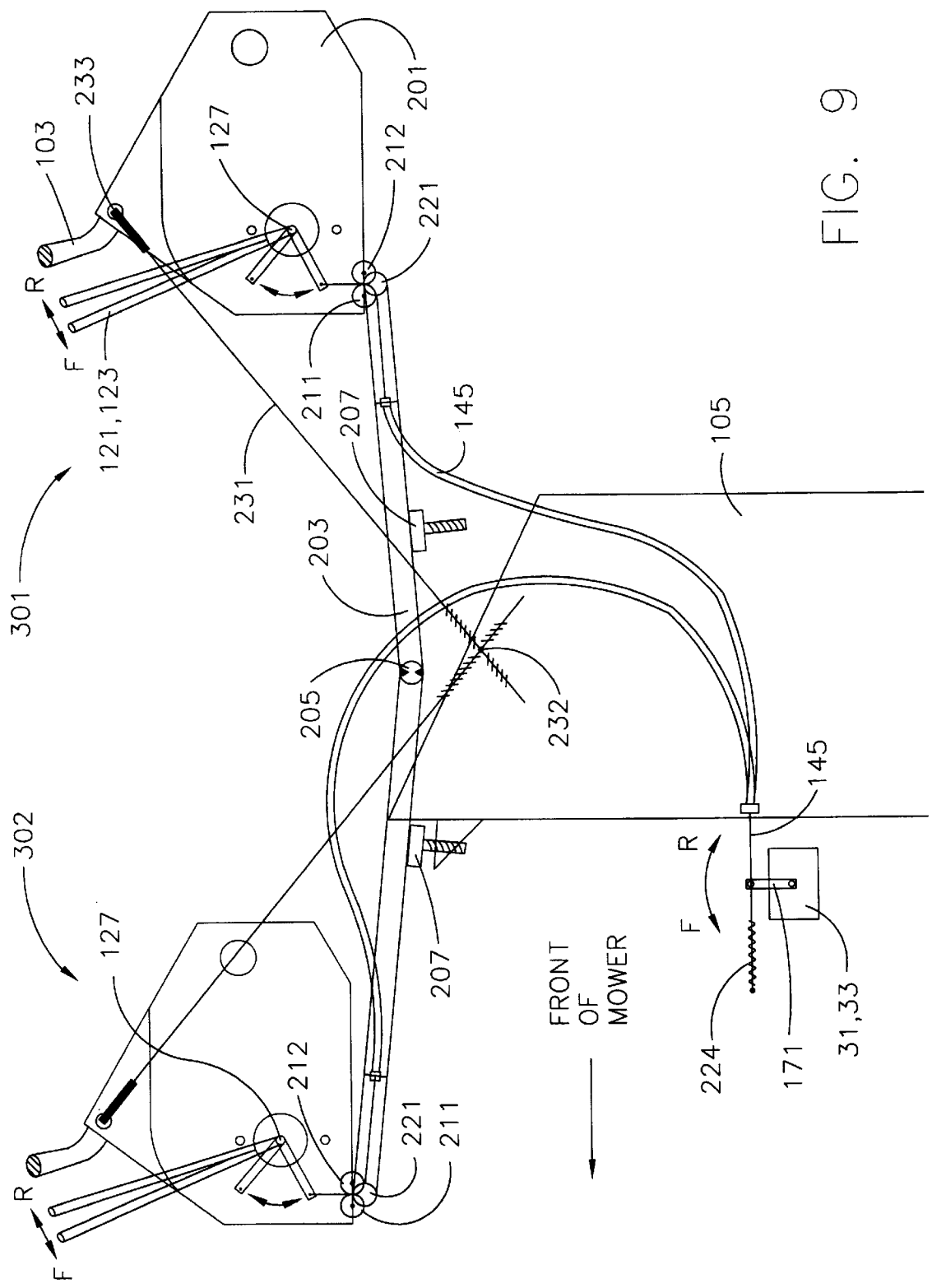

FIG. 9 is a side elevation/schematic view of a pivoting handle bar system (including a stand/ride-on position and a walk-behind position) which may be used in conjunction with any of the mowers of FIGS. 1–8.

Figure 10:
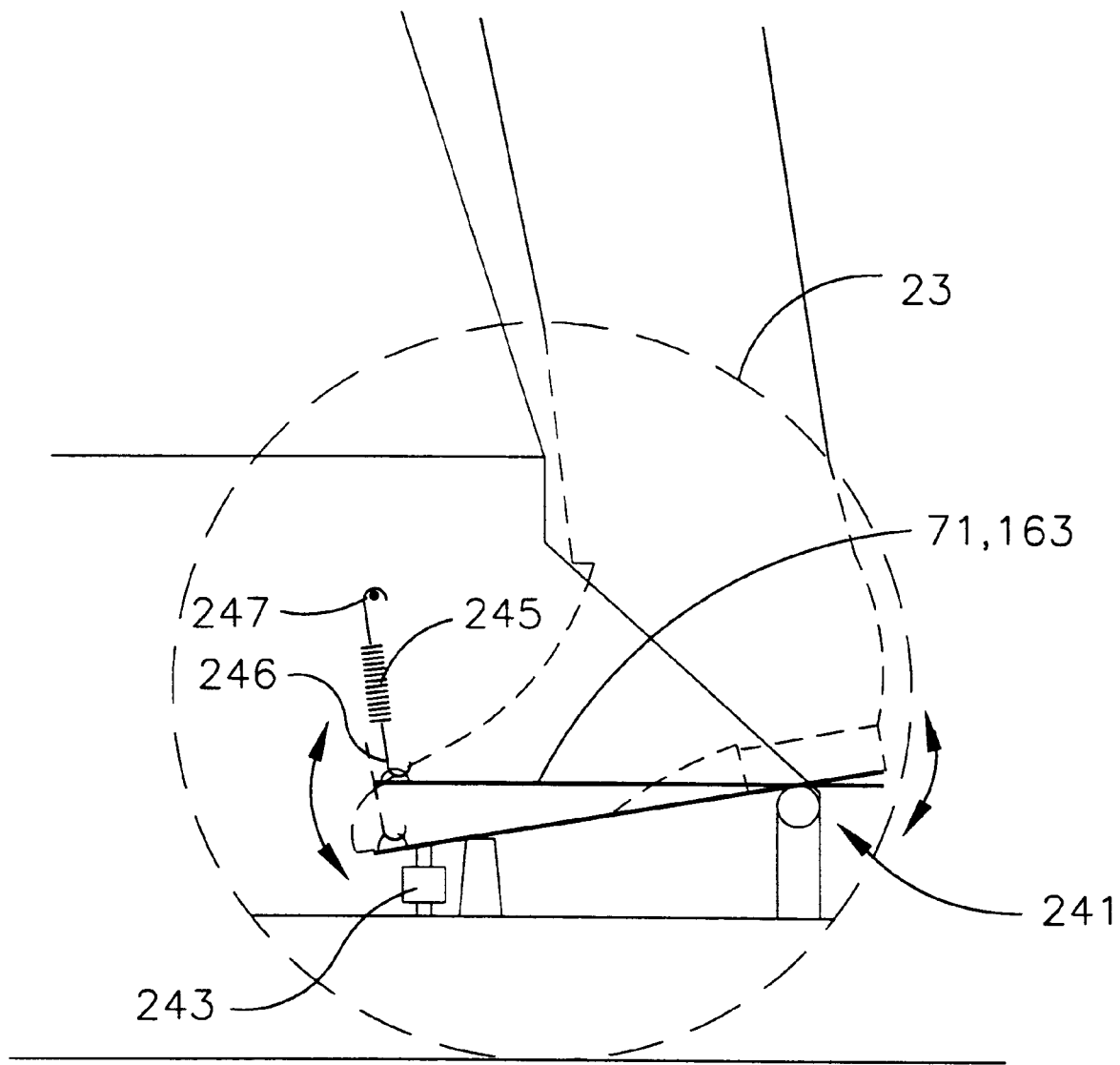

FIG. 10 is a side elevational view of an embodiment according to this invention including a deadman switch operatively associated with the foot platform, this deadman switch being used in conjunction with any of the power mowers illustrated and described with respect to FIGS. 1–9 herein.

DETAILED DESCRIPTION OF CERTAIN EMBODIMENTS OF THIS INVENTION

Referring now more particularly to the accompanying drawings in which like reference numerals indicate like parts throughout the several views.

Figure 1:
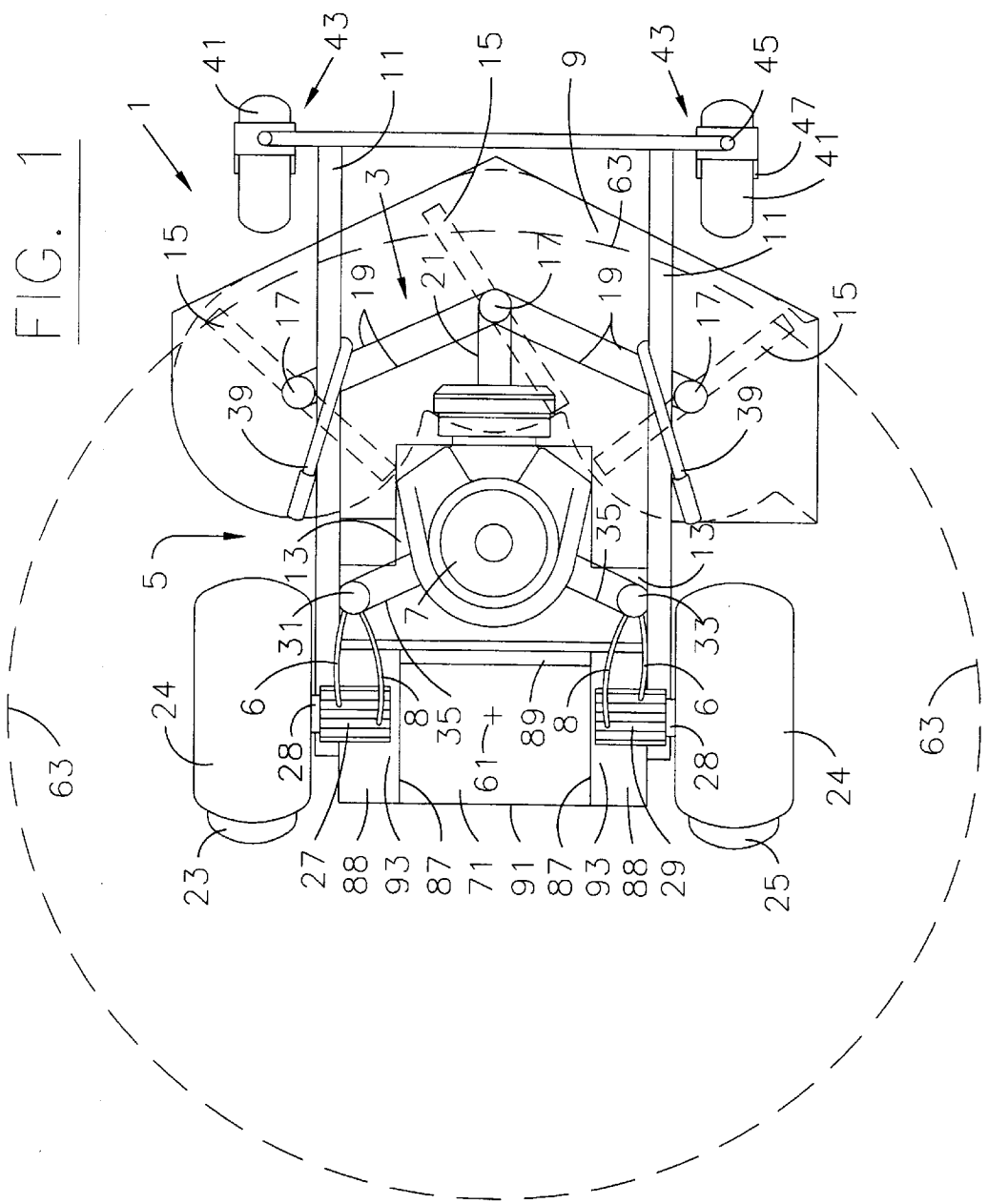
FIG. 1 is a top view of a zero turning radius power lawn mower according to certain embodiments of this invention.
Figure 2:
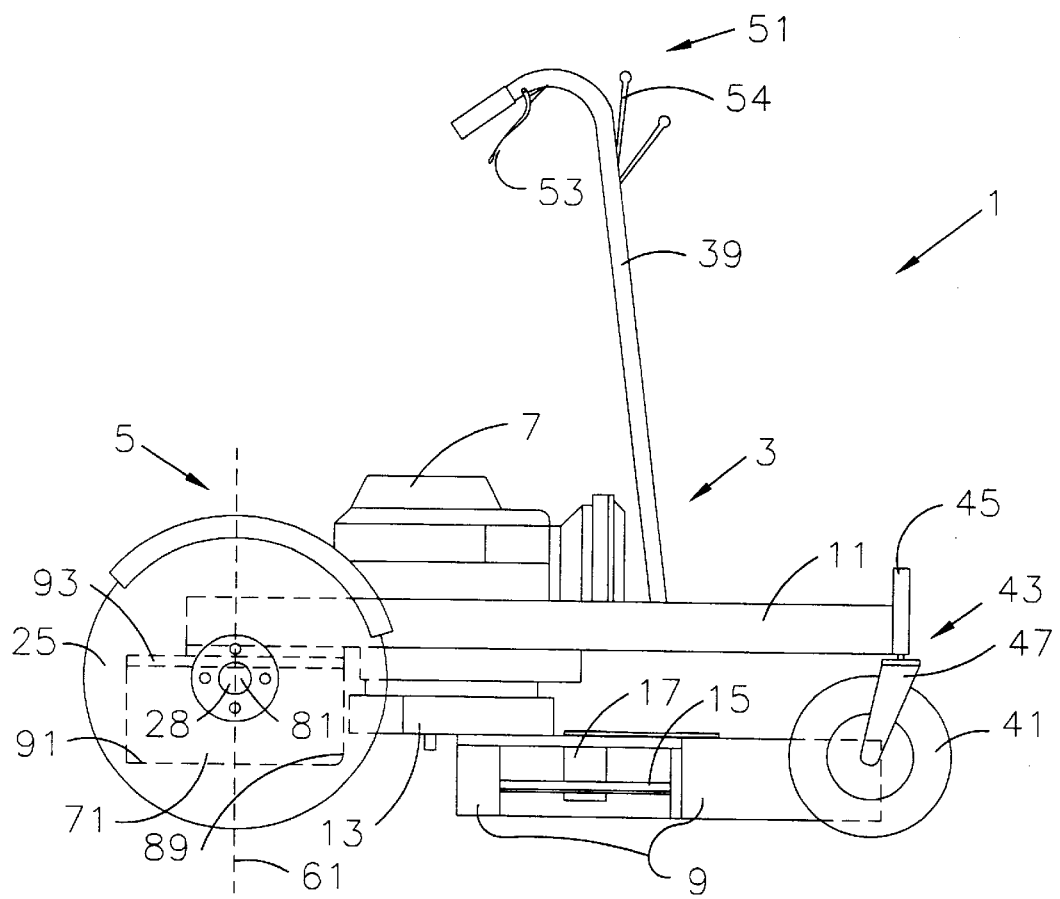
FIG. 2 is a side elevational view of the power mower of FIG. 1 according to certain embodiments of this invention.

FIGS. 1 and 2 are top and side views respectively of power lawn mower 1 according to a first embodiment of this invention. Power lawn mower 1 includes cutter assembly 3 and drive assembly 5.

Cutter assembly 3 includes engine 7 and cutter or mower deck 9. Mower deck 9 is mounted on and below frame 11 in front of engine 7 and engine deck 13. Mower deck 9 is positioned close to the ground below engine deck 13, and engine 7 in certain embodiments of this invention. Decks 9 and 13 may be considered part of the frame by those of skill in the art. In the first embodiment as shown in FIG. 2, mower deck 9 is mounted on and connected to both engine deck 13 and frame 11. Frame 11 includes a pair of substantially parallel frame members which extend longitudinally along mower 1. Mower deck 9 (or alternatively the mower wheels) is vertically moveable or adjustable so as to adjust the height of the cut. Deck 9 may be about 36–52 inches wide according to certain embodiments.

Mounted below mower deck 9 is one or more (e.g. three) cutting members or blades 15 which rotate in a horizontal plane on vertical shaft(s) 17 which are coupled to engine 7 by way of a belt drive assembly including belts 19 and 21. Three cutting blades 15 and corresponding shafts 17 are provided in the first embodiment. Alternatively, as few as one blade 15 and as many as five blades 15 may be provided in certain other embodiments of this invention.

As shown in FIG. 1, drive belt 21 is coupled between the central vertical shaft 17 and engine 7. Secondary blade belts 19 are connected between the central vertical shaft 17 and the two peripheral shafts 17 respectively. Thus, belts 19 are driven as a result of central shaft 17 being driven by belt 21 which is coupled to and powered by engine 7. Cutter assembly 3 and its associated drive and engine 7 are conventional in nature and therefore will not be discussed in further detail.

Drive assembly 5 includes engine deck 13 for supporting conventional gasoline engine 7 (e.g. 2 cylinder, 22 HP, V-twin), rear drive wheels 23 and 25, hydraulic (hydrostatic) pumps 31 and 33, motors 27 and 29, etc. Each drive wheel assembly optionally includes a protective fender 24. First and second rear drive wheels 23 and 25 are mounted either directly or indirectly on the mower frame and are generally disposed on opposite sides of engine 7. Hydrostatic drive wheel motors 27 and 29 are mounted on mower 1 so as to drive wheels 23 and 25 respectively. Hydrostatic pumps 31 and 33 are mounted on either engine deck 13 or frame 11 as shown. Hydrostatic pump 31 is in communication with motor 27 and left rear drive wheel 23 while hydrostatic pump 33 communicates with hydrostatic motor 29 and right rear drive wheel 25.

Each rear drive wheel 23 and 25 is mounted on its own drive axle 28 in certain embodiments of this invention. Axle 28 for wheel 23 may be part of motor 27 or alternatively may be separate from motor 27. The same is true for axle 28 upon which rear wheel 25 is mounted. In certain other embodiments of this invention, both rear drive wheels 23 and 25 may be mounted on a single supporting axle.

Hydrostatic pumps 31 and 33 are in conventional communication with hydrostatic motors 27 and 29 by way of, for example, a plurality of hydraulic fluid hoses 6 and 8 disposed between each pump and corresponding motor. Pumps 31 and 33 including known swash plates (not shown) generate hydraulic fluid pressure which is translated through one of two hoses 6 and 8 connecting each pump (31 or 33) to its motor (27 or 29). Hydraulic hoses 6 and 8 are coupled between each pump (31 and 33) and its motor (27 and 29)

so as to allow hydraulic fluid to flow in both directions between each pump and its motor. One hydraulic hose (6 or 8) is for allowing hydraulic fluid to flow in one direction and the other hose is for permitting the fluid to flow in the opposite direction.

For example, when fluid flows from pump 33 (or 31) to right drive wheel motor 29 (or 27) via hose 6 and back to pump 33 through hose 8 then motor 29 and wheel 25 are driven in the forward direction. The speed at which wheel 25 is driven depends upon the rate of flow. However, when the fluid flow is reversed so that the fluid flows to motor 29 through hose 8 and back to pump 33 through hose 6, then motor 29 and wheel 25 are driven in the reverse direction.

Hydrostatic pumps 31 and 33 are driven by engine 7 by way of belts 35. Each pump 31 and 33 includes a conventional pump control lever 171 (e.g. see FIGS. 7 and 9) extending therefrom for permitting the standing operator to control the speed and forward/reverse sense of each rear drive wheel via a hand lever 53 (or levers 107, 109, 117, 119, 121, 123) provided on the handle 39 of mower 1.

Alternatively, motors 27 and 29 could be positioned on frame 11 or deck 13 adjacent engine 7 so that rear drive wheels 23 and 25 could instead be driven by chains or gears in a known manner, or other variable speed devices may be attached to produce a zero radius turning mower.

Front caster wheels 41 are mounted at the front of mower deck 9 or frame 11 by way of conventional caster assemblies 43. Each caster assembly 43 includes caster pivot 45 and caster support 47. Caster assemblies 43 allow mower 1 to be turned in any and all directions by rear drive wheels 23 and 25 as will be discussed more fully below.

Upwardly extending handles are provided for handling and manipulating mower 1 and include a pair of handle members 39 and optionally a cross member (not shown) secured between handle members 39 to hold them structurally substantially parallel to one another in a spaced apart manner. Each handle member 39 is connected to either frame 11 or mower deck 9 by way of bolts, screws, welds, or any other conventional connectors. Handle members 39 extend upwardly and slightly rearwardly toward the standing operator according to certain embodiments of this invention so as to allow the operator to grip handles 39 and thereby control mower 1 via various controls (all of which are not shown) mounted on handles 39.

Speed and turning control assembly 51 is attached to handle members 39 near the gripping portions thereof and includes speed control levers 53 connected to each handle 39. Each speed control lever 53 which is pivotally mounted on a handle member 39 is conventionally coupled to one of pumps 31 or 33 by way of their control lever 171 so that the lever 53 mounted on left handle 39 is coupled to left pump 31 and controls the speed of left rear drive wheel 23 and the other lever 53 which is mounted on right handle 39 controls the speed of right rear drive wheel 25 via right hydrostatic pump 33 and motor 29.

The direction (forward/reverse) that each drive wheel 23 and 25 is driven is also conventionally controlled by the standing operator via control levers mounted on handles 39. Speed control levers 53 may also be used to control the direction or, alternatively, different levers 54 can be coupled to pumps 31 and 33 for controlling direction in a known manner.

In operation, when engine 7 is running, hydrostatic pumps 31 and 33 are driven at substantially the same speed. Hydraulic fluid under pressure is variably delivered to wheel motors 27 and 29 through first and second conduits 6 and 8 extending between each pump and its respective motor. When the direction of fluid flow to the motor is through the first conduit 6 and return flow to the pump through the second conduit 8, the motor (27 or 29) is driven in the forward direction so that its respective drive wheel (23 or 25) is also driven in the forward direction. On the other hand, when the fluid flow is in the opposite direction (i.e. going from the pump to the motor through the second conduit 8 and returning to the pump through the first conduit 6) this will cause the motor to operate in the reverse direction so as to cause its respective drive wheel to be driven rearwardly. Whether or not drive wheels 23 and 25 are driven in either the forward or rearward direction is determined by the position of the above discussed control levers mounted on each handle member 39.

In such a manner, the standing operator may conventionally manipulate the control levers so as to cause rear drive wheels 23 and 25 to either: (i) both be driven in the forward direction; (ii) both be driven in the rearward direction; or (iii) one be driven in the forward direction with the other being driven in the rearward direction.

In certain embodiments of this invention, a 1–2 gallon hydraulic fluid reservoir 151 for supplying pumps 31 and 33 is mounted (e.g. on and between handle members 39) substantially above pumps 31 and 33. Clutch and brake levers may also be mounted on handles 39 in certain embodiments of this invention.

Turning of mower 1 is carried out in one of three ways. Firstly, the standing operator can cause mower 1 to turn in either direction by stopping one of the two rear drive wheels 23 and 25 (e.g. via clutch or brake) while allowing the other to continue to be driven in either the forward or reverse direction. This may be carried out via the conventional handle 39 mounted control levers. Secondly, the standing operator can cause the mower to turn by allowing drive wheels 23 and 25 to be driven in the same direction (forward or reverse), but at different speeds. Thirdly, the operator can turn mower 1 by causing rear drive wheel 23 to be driven in one direction and the other drive wheel 25 to be driven in the opposite direction.

When rear drive wheels 23 and 25 are driven in opposite directions at substantially similar speeds, substantial zero radius turning is accomplished about center axis or point 61 of circle 63. In zero radius turning, mower 1 turns either leftwardly or rightwardly (depending upon which drive wheel is being driven forward) about central axis or point 61. Thus, circle 63, as illustrated, shows the path along which the front portion of mower 1 proceeds during substantial zero radius turning. During substantial zero radius turning of mower 1, central point/axis 61 of circle 63 is positioned along or near the rear drive wheel axis as shown in FIGS. 1 and 2. Accordingly, what is meant by "zero radius turning" is that mower 1 turns about a point 61 or axis disposed between the drive wheels, and that point/axis 61 does not move to any great extent during the turning.

Platform 71 for supporting the standing operator or occupant is disposed between rear drive wheels 23 and 25 along rear drive wheel axis 81 which is defined by the rear drive wheel's axes of rotation. By positioning standing platform 71 between rear drive wheels 23 and 25 substantially along (i.e near) drive wheel axis 81 so as to include central point/axis 61, the standing operator is substantially unaffected by centrifugal force created during approximate zero radius turning of mower 1.

For example, if during a substantially zero radius turn of mower 1, the operator was positioned at a location distant from central point/axis 61 (e.g. along the front of mower deck 9 or far rearward of wheels 23 and 25, for example) then he would be adversely affected by centrifugal force created during the turn in that the operator would be pushed away from point 61 by the centrifugal force. However, when a substantial part of the mass of the standing operator is located at or very near central point/axis 61 due to the position of standing platform 71 and the handle members, he is substantially unaffected by such centrifugal force and therefore can operate mower 1 so as to take such approximate zero radius turns at higher speeds. Furthermore, by positioning the standing operator on substantially flat platform 71 in close proximity to central point 61, the operator is less affected by centrifugal force created during other (non-zero radius) turns undertaken by mower 1. The less the operator is affected by such centrifugal force, the less fatigued he becomes and the higher speeds he may allow or cause mower 1 to take such turns.

Standing platform 71, as illustrated in FIG. 2, is positioned at an elevation vertically below or near rear drive wheel axis 81 thereby enabling the standing operator to apply his weight near the ground during normal mower operations thus resulting in an effective mower center of gravity which is also close to the ground. This position of platform 71 below the tops of the rear wheels allows the standing operator's weight to be focused at a point below the wheel tops and below or near rear drive axis 81 during typical operations of mower 1 according to certain embodiments. In side hill environments, the operator is thus permitted to shift his weight in order to compensate for tipping tendencies. The resulting low center of gravity renders mower 1 safer in that it is less susceptible to tipping or rolling, especially in hilly environments. Furthermore, this low center of gravity focused along rear drive wheel axis 81 creates improved traction of rear drive wheels 23 and 25, especially during side hill mowing operations.

Platform 71 is surrounded or defined on its wheel sides by sidewalls 87 and on its engine or front side by wall 89. Motors 27 and 29 are at least partially encased behind sidewalls 87 and within compartments 88 defined thereby. Alternatively, motors 27 and 29 may be fully encased within compartments 88. Sidewalls 87 and 89 which define platform 71 protect the operator's feet and lower legs from hazards associated with engine 7, motors 27, 29, blades 15, etc. while bottom wall 91 (or 163) of platform 71 protects the operator from hazards beneath the mower such as blades 15 and flying debris.

The tops of sidewalls 87 define flat supports 93 upon which the standing operator may position his feet when he needs to increase the weight on or improve the traction of one of the rear drive wheels. This is especially helpful in side hill environments when improved traction is often required on the top (or highest) rear drive wheel (25 or 23). Because the operator is standing on platform 71, he can easily shift his weight to a side of the machine needing either additional tire traction or additional weight for counterbalancing tipping. Alternatively, seat areas for the operator to sit during side-hill operations may be provided about the areas illustrated at the top of sidewalls 87, in order to counterbalance tipping tendencies.

Another advantage associated with the positioning of standing foot platform 71 between rear drive wheels 23 and 25 is that platform 71 is unlikely to bottom out or contact the ground when mower 1 goes over bumps, curbs, and the like. If, for example, platform 71 were located well behind rear drive wheels 23 and 25 as in the prior art, it would significantly increase the likelihood of the platform bottoming out as the mower traveled in a forward direction over a curb or other similar bump. However, positioning platform 71 between the rear drive wheels and near or along rear drive wheel axis 81 in certain embodiments of this invention creates a situation where the possibility of standing operator platform 71 bottoming out as the mower goes over bumps, curbs, and the like is greatly minimized.

The positioning of at least a portion of platform 71 between rear drive wheels 23 and 25 substantially along or near rear drive wheel axis 81 also results in mower 1 being less susceptible to popping wheelies when the mower is accelerated, especially when going up hills. This is because the positioning of the standing operator's weight along or near rear drive wheel axis 81 (as opposed to at a location behind the rear drive wheels) results in the mower's center of gravity being closer to the front of the mower thereby resulting in it being less likely to pop wheelies upon acceleration.

It is noted at this point that in the prior art, burdensome counterweights (not shown) often had to be affixed to the front of walk-behind power mowers in order to move the mower's center of gravity forward so that the mower would not pop wheelies upon acceleration.

Yet another advantage of platform 71 being disposed between rear drive wheels 23 and 25 (as opposed to at a position rearwardly thereof) is that there is less of a need for disposing such counterweights along the front of the mower. This is because the operator's weight is located substantially near or along the rear drive wheel axis, and not at some position rearwardly thereof which requires the positioning of large counterweights on the front of the mower. Accordingly, the position of platform 71 also allows engine 7 to be located more rearwardly (e.g. over the toes or feet of the operator) than in the prior art, thus resulting in a larger mower and engine decks 9 and 13, and more room for repairs and other such needs.

Mower 1, as described above, has a reduced overall length with respect to certain prior art mowers as a result of platform 71 being located between rear drive wheels 23 and 25. This allows the mower to be more easily and efficiently operated in tight locations and, in fact, permits mower 1 to access regions previously unaccessible. The shorter overall length of mower 1 also allows for more compact storage and transport. Furthermore, by allowing the standing operator to be between the rear wheels, the operator is less likely to impact obstacles such as trees and the like during mower operations in tight environments such as woods, heavy brush, etc.

While certain preferred embodiments of this invention involve power lawn mowers, the standing operator platform of this invention may also be placed between the rear drive wheels of other power driven devices such as soil or lawn aerators, or other powered lawn maintenance devices.

According to certain alternative embodiments, a operator seat could be positioned at or near point/axis 61 so as to make the mower a seated-operator type mower.

Figure 3:
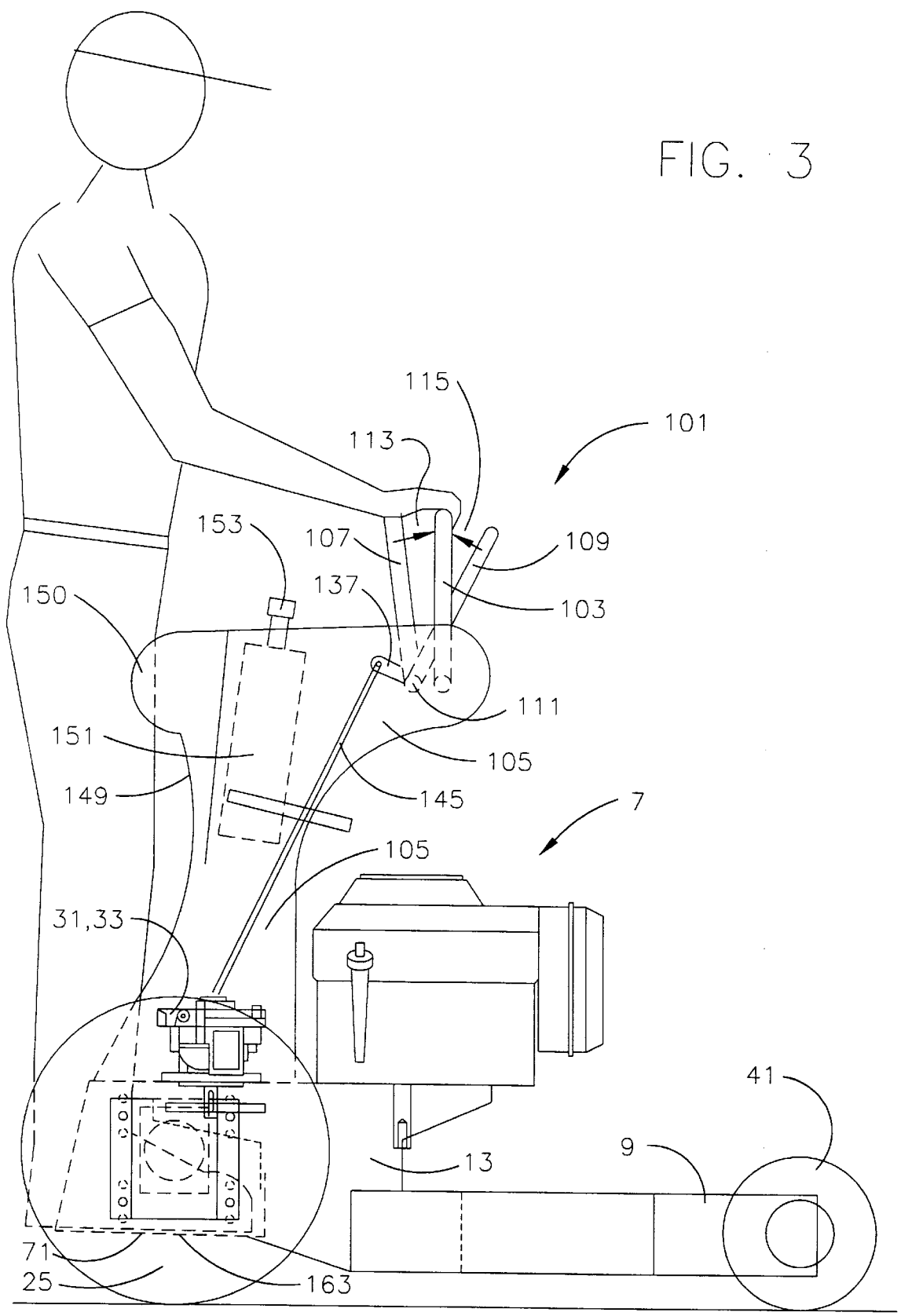
FIG. 3 is a side elevational view of a zero radius turning power mower according to another embodiment of this invention.

FIG. 3 is a side elevational view of a zero radius turning mower to be operated by a standing occupant, according to another embodiment of this invention. As illustrated, the self-propelled power mower in FIG. 3 includes front caster wheels 41, mower deck 9 beneath which the cutting blade or blades 15 are rotatably mounted, engine deck 13 upon which gasoline engine 7 is mounted (engine 7 is located forward of the rear drive wheels), a pair of rear drive wheels 23 and 25, foot platform 71 for supporting the feet of the standing operator or occupant, and first and second hydraulic pumps 31 and 33 for independently powering the respective rear drive wheels.

According to this embodiment, the zero radius turning stand-on mower of FIGS. 3 and 6 further includes an improved handle assembly 101 including rigid handle member 103 that is rigidly affixed to support member 105, and a pair of pivoting handle members 107 and 109, respectively, disposed on opposite sides thereof. Pivoting handle members 107 and 109 rotate/pivot together about an axis or axes defined substantially at point 111. Handle system 101 allows the standing occupant to maintain his/her hands on stationary non-pivoting rigid bar 103 during both forward and reverse operations for improved balance/stability, while pivotal levers 107 and 109 permit maximum leverage and stroke while the occupant maintains a firm grip on the mower. Each lever 107, 109 includes a right-hand portion and a separate and independent left-hand portion (see FIG. 6). An elongated rod 145 extends from each of the right and left-hand levers to the corresponding pumps 31, 33.

Optionally, a second adjustable rigid handle member may be positioned on the operator side of the forward levers 107, so that there would be a separate rigid handle member for the forward and for the reverse directions. In such embodiments, a single pivoting lever 107 between the two rigid handle members is used for both forward and reverse of each drive wheel. Also, the positions of both rigid handle members (103) in such embodiments may be adjustable.

For the occupant to cause the mower to move in the forward direction, the occupant simply pushes lever 107 forward 113 toward rigid handle member 103, with the amount of movement forward of lever 107 dictating the speed of the corresponding (right or left) rear drive. wheel in the forward direction. During full speed ahead operations, the user simply pivots and holds one or both of forward levers 107 flush against rigid member 103. When the standing occupant releases lever 107, it is spring biased to pivot backward to the position illustrated in FIG. 3 thereby placing the corresponding rear drive wheel and pump in the neutral state. In a similar manner, in order to cause a rear wheel(s) of the zero radius turning mower to operate in reverse, the standing occupant merely pulls and pivots reverse lever 109 rearwardly 115 toward member 103, with the amount of rearward pivoting of lever 109 about axis 111 dictating the speed of the corresponding drive wheel in the reverse direction. Thus, for a constant full speed reverse movement of a rear wheel(s) of the mower, the operator may simply pull lever 109 backward and hold it flush against the front surface of lever 103 until the standing occupant desires to halt reverse operations. Upon the operator letting go of lever 109, it will spring bias back into the neutral position along with the corresponding lever 107, as illustrated in FIG. 3. As can be seen, whether the standing occupant wishes to place rear wheel(s) of the mower in forward or reverse, his/her hands may always remain in contact with rigid handle member 103 while manipulating forward levers 107 (121, 123) and reverse levers 109 (117, 119), thereby improving the stability of the system and improving the standing occupant's balance on platform 71.

FIG. 6 is a close-up perspective view of handle control system 101, also illustrated in FIG. 3. Reverse lever(s) 109 includes right-hand lever 117 and left-hand lever 119. As can be seen, right-hand reverse lever 117 is independent and separately pivotable from left-hand reverse lever 119. Rearward pivoting movement of lever 117 toward rigid handle member 103 will cause the right rear drive wheel to move in a reverse direction, while rearward pivoting movement of left-hand reverse lever 119 toward rigid handle member 103 causes the left rear drive wheel to move in the reverse direction, with the amount of rearward movement of these levers determining the amount or speed of rearward rotation of the corresponding drive wheel. At illustrated, lever 117 is connected via linkage to pump 33, while lever 119 is connected via linkage to pump 31.

Likewise, forward pivoting movement of right-hand forward lever 121 toward member 103 will cause the right rear drive wheel 25 to move in the forward direction, while forward pivoting movement of left forward lever 123 causes the left rear drive wheel 23 to move or rotate about its axis in the forward direction. Movement of lever 121 (and 117) causes corresponding movement of lever member 171 of pump 33, while movement of lever 123 (and 119) causes movement of member 171 of pump 31.

Adjustable elongated threaded members 125, that are pivotally attached to both the rear and front levers 107 and 109 to interconnect same, are provided for allowing the distance between the front and the rear levers to be adjusted. Thus, levers 107 and 109 are fully adjustable in order to alter the reach and forward/reverse speed limits of the mower. The stroke limit of each lever is reached when the lever at issue hits rigid member 103 and is prevented from further movement. According to certain embodiments, the handle grip members of reverse levers 117 and 119 may be designed to feel different (or be smaller) than rigid handle member 103, so that the standing occupant would readily realize (without looking) whether he/she was grasping the rigid member 103 or reverse lever(s).

As illustrated in FIG. 6, broken rigid bar(s) 127 extend between the pair of spaced arms of support 105, and support the right-hand levers (117, 121) and the left-hand levers (119, 123). Thus, the right-hand forward and reverse levers move together with one another when the corresponding elongated member 127 pivots about axis 111. Likewise, the two left-hand levers 119 and 123 pivot together with one another. There is a break in the length of member 127 so that, for example, right lever 121 is moveable separately from, and independent of lever 123.

Rigid handle member 103 is non-pivotally affixed to each elongated arm 105 of the support, and extends between these arms, by way of fasteners 131, or appropriate welding. Extension members 137 extend from either bar 127 or lever shafts 141 in order to connect the pair of control rods 145 with their corresponding drive wheel levers 117, 119, 121, and 123. Control rods 145 extend downward from extension members 137 to the hydraulic or hydrostatic pumps 31, 33 that control rear drive wheel rotation, one rod 145 per pump. Thus, movement of one of levers 117–123 in turn causes pivotal movement of a section of a bar 127 about axis ill, thereby resulting in vertical movement of the corresponding control rod 145 by way of member(s) 137. Movement of the control rods 145 causes the corresponding pump 31, 33 to control the direction and speed of the corresponding rear drive wheel 23, 25.

Figure 4:
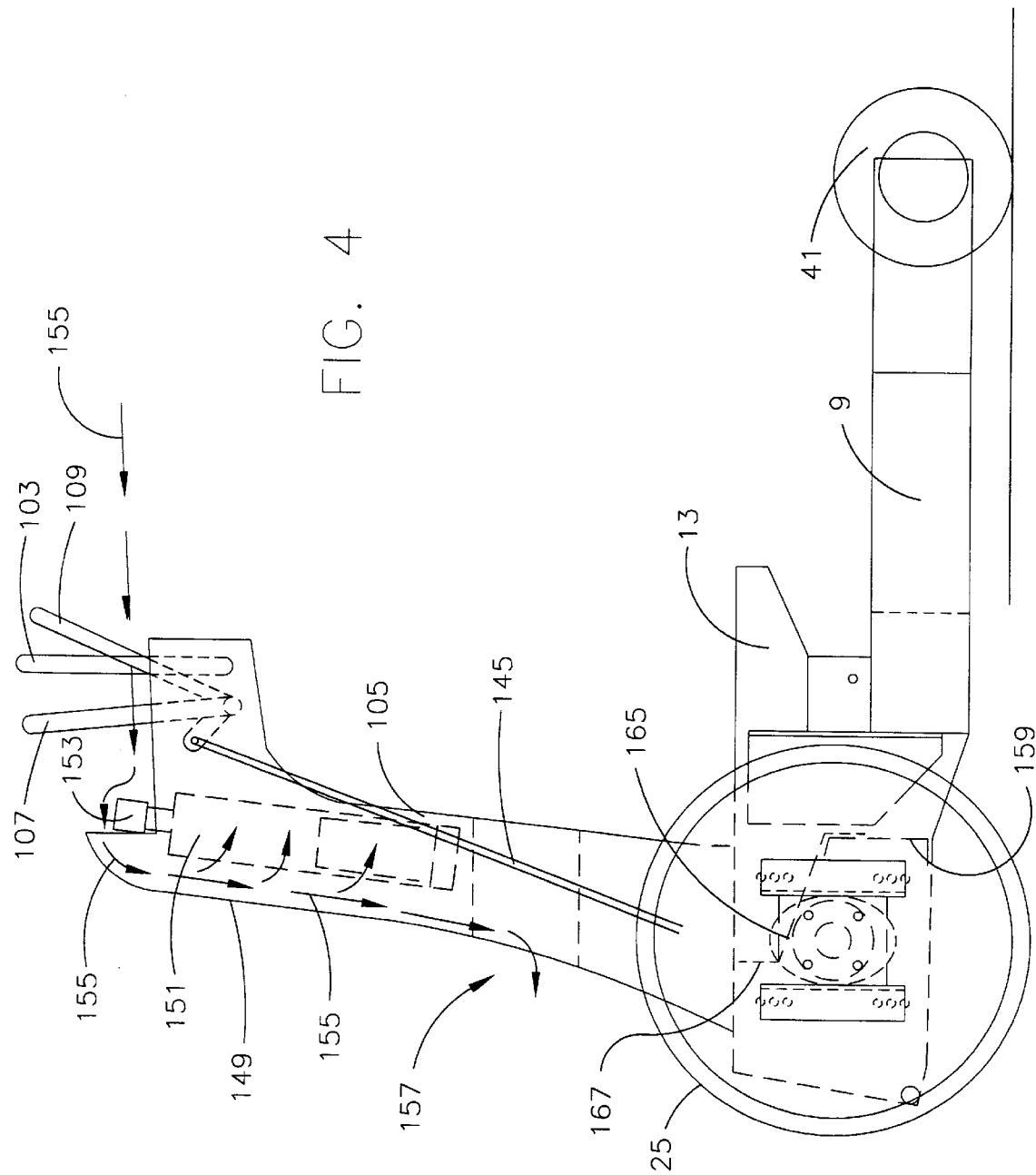
FIG. 4 is a side elevational view of a zero radius turning power mower according to still another embodiment of this invention.

As shown in FIGS. 3, 4, and 6, support 105 includes a pair of spaced upwardly extending forwardly curved arms to which the handle mechanism 101 is mounted. Furthermore, support 105 includes a rear plate 149 that extends between (and connects) the spaced arms, and is provided for the purpose of allowing the standing occupant to rest the front of his/her thighs or stomach against same during operation of the mower. Thus, a front thigh or stomach rest is defined by curved plate 149. Additionally, side thigh rest members 150 may be attached to support 105 so as to aid an operator's stability when cornering larger than zero radius turns, and also allow the operator to lean back slightly and to the side during side hill operation in order to stay vertical (see FIG.

3). Side leg or hip rests 150 are of a size so that when unexpected mower movement forces the user to one side, the user would be stopped or supported by rests 150. However, rests 150 may be small enough so that the user may consciously slide around and beyond same during extreme side hill operation of the mower.

As shown in FIGS. 3–4, mounted within the housing defined between support 105 sidewalls and thigh rest plate 149 is hydraulic fluid tank or container 151, including top 153 thereof. Plate 149 prevents the standing operator's legs from coming into contact with tank 151, which sometimes becomes quite hot during mower operation. Hydraulic lines connect tank 151 to the hydraulic pumps 31, 33 located below.

The FIG. 4 embodiment differs from the FIG. 3 mower embodiment due to the configuration of support 105. In the FIG. 4 embodiment, support 105 again has a pair of spaced upwardly extending arms between which rear thigh resting plate 149 extends connecting the arms. However, in the FIG. 4 embodiment, support 105 is designed to receive air flow 155 which functions to help maintain hydraulic tank 151 at an acceptable temperature during mower operation (i.e. cools-the tank). As illustrated, when the FIG. 4 mower is moving in the forward direction, air flows 155 through the handle assembly and is guided by the front of rear plate 149 downwardly behind and around tank 151. This cooling air flow 155 is permitted to escape support 105 at an area 157 located vertically beneath tank 151.

Figure 5:
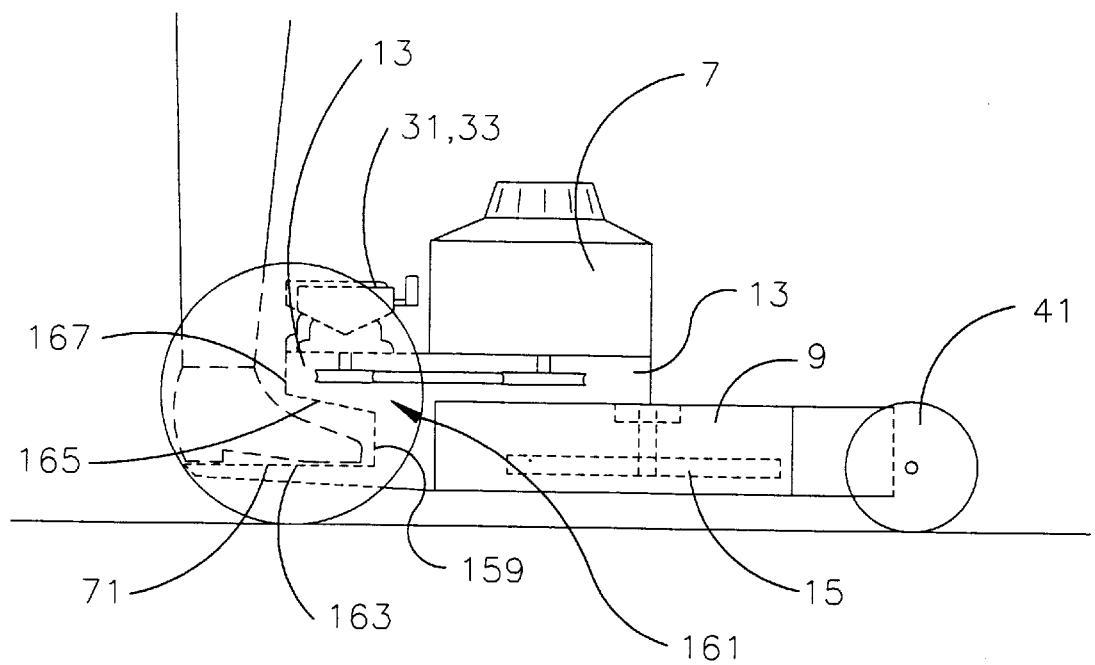
FIG. 5 is a partial side elevational view of the lower portion of the FIG. 3 or 4 mower.

FIG. 5 is an elevational view illustrating how the compartment of foot platform 71 undercuts the frame or engine deck 13 according to certain embodiments of this invention. See also FIGS. 2–4. As shown, the foot supporting surface 163 of platform 71 extends forwardly of and underneath of a portion of frame or deck 13 until reaching front or forward wall 159 of the foot platform compartment. Thus, space is saved in that the engine deck, pulley and belt assembly 161, and/or pumps 31, 33 are located vertically above each of the operator's feet and a substantial portion (e.g. at least about 1–3 inches) of the foot platform. This both conserves space and functions to protect the operator's feet from flying debris and the like. The foot platform compartment illustrated in FIGS. 3–5 includes foot supporting surface 163, front wall 159, top or upper wall 165, sidewalls 87, and wall portion 167 that connects top wall 165 with the top surface of the frame or engine deck. Top wall 165 extends rearwardly from front wall 159 at least one-third of the total length of foot platform 71 to wall 167, and preferably a length of at least about one-half thereof.

FIG. 7 is a perspective/schematic view of pump control lockout system 169 according to an embodiment of this invention, pump lockout system 169 being usable in conjunction with any of the self-propelled zero radius turning mowers of FIGS. 1–6. Lockout system 169 is operatively associated with right-hand forward hand lever 121 and left-hand forward hand lever 123 adapted to be held and manipulated by hands of the standing operator, control rods 145, extension members 137 which interconnect control rods 145 and the forward levers, a pair of elongated members 127 about which at least one of levers 121, 123 rotate or pivot, hydraulic (hydrostatic) pumps 31 and 33 for controlling movement of the rear drive wheels, and pivoting arms or levers 171 which pivot about axes 172 thereby allowing vertical movement of rods 145 to control pumps 31 and 33. The lockout system 169 includes rotatable elongated bar member 173 which rotates about axis 174, hand manipulated lever 175 to be mounted on support 105, elongated control rod 176, connecting member 177 for connecting hand lever 175 with rod 176, pivoting members 178 operatively connecting bar 173 with rod 176, elongated control rods 179, rear wheel brake bands 180 operatively associated with the rear drive wheels for the purpose of encircling respective brake drums on the rear drive wheels, and V-shaped members 181 which pivot about axes 182 and connect brake bands 180 with control rods 179. Optionally, lever 175 may be foot actuated and mounted to the body of the mower proximate feet of the user. Alternatively, brake shoes (instead of bands 180) may be used to apply brake forces to the rear drive wheels.

Pump control lockout system 169 operates as follows. Firstly, hand lever 175, resting against stop member 183, is illustrated in the "on" (i.e. pump locking and wheel braking) position in FIG. 7. When lever 175 is rotated about axis 184 from the off position to the "on" position illustrated in FIG. 7, rod 176 and rods 179 are all caused to move vertically upward thereby causing members 181 to rotate clockwise (as illustrated) about axes 182 (for each rear drive wheel, or alternatively for only one of the rear drive wheels) thereby tightening brake band(s) 180 around the drums (not shown) so as to apply a brake force to the respective rear drive wheel(s) and not allow the wheel to move. During movement from the "off" to the "on" position, the forces of the brakes bias the lever 175 vertically downward after it has been pivoted beyond the over center position vertically above pivot 184. Thus, the need for stop 183. In the "off" position, only gravity acts to pull lever 175 vertically downward, to a stop.

When lever 175 is caused by the standing occupant to be pivoted counterclockwise about axis 184 away from the on position downward to the off position, this causes rod 176 to move vertically downward, which in turn causes member 178 to pivot downward or counterclockwise along with bar 173 about axis 174 thereby causing control rods 179 to move downward thereby loosening the pair of brake bands 180 as members 181 pivot counterclockwise about axes 182.

Furthermore, when system 169 is in the illustrated "on" position, pump locking members 185 that are rigidly affixed to rotating bar 173 are caused to be in the position illustrated in FIG. 7, where recess or cutaway portions 187 defined in locking members 185 substantially surround and prevent pump levers 171 from pivotal movement in either direction, thereby maintaining (locking) pumps 31 and 33 (and the rear drive wheels) in neutral. When hand lever 175 is pivoted from the "on" position counterclockwise (as viewed in FIG. 7) about axis 184 toward the "off" position, this causes both bar 173 and members 185 to rotate counterclockwise about axis 174 thereby releasing or unlocking pump levers 171 so that they may freely pivot about axes 172 in either direction when caused to do so by handle members 121 and 123 (and/or 117, 119). According to certain embodiments of this invention, bar 173 is rotatably mounted between the spaced members of support 105. Accordingly, system 169 prevents accidental movement of the mower, and the parking brakes 180 cannot be set until both pumps 31, 33 are in neutral.

FIGS. 8(a) and 8(b) illustrate a freely pivotal wheelie bar(s) 191 which may be used in conjunction with the zero radius turning mowers of any of FIGS. 1–7 according to certain embodiments of this invention. As shown, a single rigid weighted wheelie bar member 191 is mounted proximate each rear wheel 23, 25 of the zero radius turning mower by way of rigid support bar member 192. The purpose of the two pivotal wheelie bars 191 mounted to the mower, is to prevent backward tipping of the mower during uphill operation or movement of the mower. A rubber bumper 200 may be attached to either bar 191 or the mower in order to quiet operation. When the mower is moving on a flat and level surface, the wheelie bar 191 adjacent each rear wheel hangs straight downward from point 192 so that it forms an angle θ of approximately 90° (from about 80°–100°) with the ground surface 190 (see wheelie bar position 193 in FIG. 8(*a*)). However, when the mower is caused by the standing occupant to travel up a hill or incline, gravity causes each of the two wheelie bars 191 to pivot backward about axis 192 rearwardly of the mower so as to enlarge to overall length of the mower and prevent backward tipping of same. If the mower were to begin a backward tip when going up an incline, the bottom(s) 195 of member(s) 191 would contact the ground and prevent the mower from flipping over. When going up hills, the bar(s) 191 pivot about 192 and define an angle θ of from about 90°–180° (preferably between about 90°–135°) with the ground 190. For example, on a 10° incline, θ would be about 100°. Rigid stops 193 may keep θ between 90° and 135°. Angle θ is 90° when the mower is on horizontal ground. Optionally, an electric switch may be actuated when bar 191 contacts stop 193 or the like so that blade and/or engine operation. can be stopped during extreme incline conditions (i.e. stop the blades during potential flip conditions).

Because each of the two wheelie bars 191 is freely pivotable about axis 192, both wheelie bars 191 are substantially always vertically aligned relative to the horizontal, even when the mower is going up hills. Rearward pivoting of each bar 191 is limited by way of a stop member 193 which is rigidly mounted to support piece 194 that protrudes from support 105, so that if the mower begins to tip backward, the bottom 195 of each wheelie bar 191 will engage the ground surface and prevent such backward tipping. FIG. 8(*a*) illustrates five different possible positions of each bar 191, depending upon the angle or level of the surface 190 upon which the mower is traveling. Note that each wheelie bar 191 includes an elongated portion extending between axis 192 and enlarged weighted end portion 196.

FIG. 9 is a schematic/side elevation view of a pivoting handle bar system which may be used in conjunction with any of the mowers discussed above according to certain embodiments of this invention. This handle system is pivotal between a stand-on mode 302 and a walk-behind mode 301. As illustrated, the handle bar system is attached to support 105 (between the arms thereof at the top of same), and includes dashboard 201, rigid handle member 103 attached thereto, pivoting handle members 121 and 123 for controlling forward and/or reverse directions of the mower, supporting bar(s) 203 pivotable about axis 205, a pair of stops 207, pumps 31, 33 operatively connected to handle members 121, 123 by way of cable mechanism 145 and levers 171, and a pair of rotatable pulley members 211, 212 affixed to dashboard 201 and/or support 203 for the purpose of maintaining cable 145 in a position as it leaves lever(s) 137 such that lever(s) 137 are rotated in the same directional manner (e.g. counterclockwise about axis 127 to cause forward movement) regardless of whether dashboard 201 is in the right-hand walk-behind position illustrated in FIG. 9, or alternatively pivoted to the left-hand stand-on position illustrated in FIG. 9.

As shown in FIG. 9, the handle bar assembly, including dashboard 201 which is pivotally mounted to supporting member 203 at pivot 221, may be pivoted between at least the two separate positions, about pivot axis 205. When the handle assembly is in the position illustrated at the left-hand side of FIG. 9 (i.e. closest to the front of the mower and forward of the rear drive wheels), it is in a ride-on mode wherein the standing occupant positioned on platform 71 may manipulate the handle assembly and be substantially unaffected by centrifugal force during zero radius turns of the mower. Alternatively, if the occupant should desire to walk behind the mower instead of standing on it during operation, the occupant may simply pivot the handle assembly rearwardly about axis 205 until it reaches the position illustrated at the right-hand side of FIG. 9 (behind or at the rear drive wheels). When the handle assembly is in the position shown at the right-hand side of FIG. 9, the mower is in its walk behind mode wherein the operator may simply walk behind the mower and manipulate the handle assembly to control same. Thus, the handle assembly pivots between a walk behind mode 301 and a standing ride-on occupant mode 302. The degree of pivot about axis 205 between the two positions may be from about 120° to 220°.

Stop members 207 halt the pivoting movement of support bar 203 about axis 205 in either direction, as illustrated. A latch (not shown) is provided to prevent unintentional movement of the handle bars in either walk or ride modes. Furthermore, a spring 224 is provided at the end of each cable 145 near the corresponding pump lever 171 so that the FIG. 9 controls are spring biased to the forward (or alternatively neutral) mower direction.

It is also important to note that pulley or guide members 211 and 212 are mounted on dashboard 201 or member 203, each rotatable about its respective axis in certain embodiments. Due to the provision of pulley members 211 and 212, lever 137 is controlled in the same manner, and in the same directions, regardless of whether the handle bar assembly is in the ride-on mode or the walk behind mode. In the ride-on mode 302, cable 145 winds around and is pressed against the outer periphery of member 212, while in the walk behind mode 301 cable 145 winds around a portion of the periphery of pulley member 211. Each of members 211 and 212 is rotatably mounted upon dashboard member 201 or member 203.

At least one (possibly a pair) rigid metal rod 231 is provided in the pivoting handle assembly for the purpose of maintaining dashboard 201 substantially level, or in substantially the same orientation relative to the horizontal, in both the walk behind and ride-on modes, as well as during the pivoting process between the two modes 301 and 302. Rod 231 may be adjustable, for fine tuning purposes. Rod(s) 231 is pivotally mounted to support 105 at pivot axis 232 and is also pivotally mounted to dashboard 201 or any other part of the handle assembly at 233. As will be recognized by those of skill in the art, only one handle assembly is provided in the system. Thus, FIG. 9 illustrates a single handle assembly in two of its possible positions 301 and 302.

FIG. 10 is a side elevational view of a pivoting deadman switch platform assembly according to an embodiment of this invention, this deadman switch being usable in conjunction with foot platform 71 in any one of the above-discussed embodiments. As illustrated, the foot supporting surface 163 (or 91) of platform 71 pivots upward and downward about axis 241. Axis 241 may be made up of a hinge or the like, rigidly mounted to the platform area or compartment of the stand-on mower of any one of FIGS. 1–5. Pressure activated switch 243 is operatively associated with the front portion of platform 71 and is located beneath a front area of wall or surface 163 thereof. Biasing spring 245 is connected at one end 246 to platform 71 and at the other end 247 to a top or sidewall of the mower platform area or compartment. Thus, when the mower is not in use or when the standing occupant is not standing on platform 71, spring 245 biases the front part of the platform upward about axis 241 so that cutting blades of the mower do not rotate. optionally, switch 243 may be rod actuated and may be located above the foot platform (i.e. where the rod for actuating the switch is connected to and/or moves with the foot platform).

Still referring to FIG. 10, deadman switch 243 is in an open state when the standing occupant is not on platform 71 and spring 245 is biasing the front edge of the platform vertically upward about axis 241. However, when the occupant stands on platform 71 and presses the front edge of surface 163 downward about axis 241 toward switch 243, the switch is actuated or closed. When switch 243 is closed and the mower is running, the cutting blades (and optionally the engine, unless blade switch is in off position) of the zero radius turning mower are permitted to rotate and cut grass. However, an opening of switch 243 functions to immediately cut off power to the cutting blades and prevents further rotation thereof. Thus, as soon as the standing occupant steps off of platform 71, switch 243 opens and the cutting blades of the mower are no longer powered. Additionally, according to certain further embodiments, switch 243 may function to cut off the mower's engine when opened. Alternatively, switch 243 may be configured so as to close when the operator steps off of the platform. In either event, power to the cutting blades stops when the operator steps off of the platform.

It is noted that pivot axis 241 is located proximate the rear (i.e. in the rear third or at the back of the platform) of platform 71 and surface 163 thereof so as to be approximately located beneath the heel portion of the standing occupant's foot. Due to this positioning of pivot axis 241, the operator must actually be in a proper mower operating position in order to keep the blades running, and also the deadman switch does not accidentally become opened or closed when the standing occupant places additional weight on the balls or toes of his/her feet, which is natural during operation of the stand-on mower discussed above. For example, if the pivot 241 were located elsewhere (e.g. at the center of the platform), the switch may be tripped if the user simply had his/her toes at the rear of the platform.

Accordingly to alternative embodiments, a deadman pedal or pedals may be provided at the front of the foot platform (on top of surface 163) so as to cut off blade rotation when the toes of the occupant's foot or feet lift up off of one or both of the pivoting deadman pedals.

According to further embodiments of this invention, the mower may include a switch for immediately cutting engine power and/or applying parking brake force to the rear wheels when the handle assembly is suddenly pivoted or otherwise forced forward as in a sudden mower stop. This could function to keep the mower from running over the occupant if he/she was to fall forward of the mower.

Once given the above disclosure, therefore, various other modifications, features, or improvements will become apparent to the skilled artisan. Such other features, modifications, and improvements are thus considered a part of this invention, the scope of which is to be determined by the following claims.

What is claimed is:

1. A zero turning radius power mower for operation by a standing occupant, comprising:

an engine;

at least one cutting member powered by said engine;

first and second rear drive wheels each independently driveable in both forward and reverse directions so as to allow for substantially zero radius turning of the mower when said first and second rear drive wheels are driven in a predetermined manner;

a riding foot platform compartment for supporting, and at least partially enclosing, feet of the standing occupant, a foot supporting surface of said foot platform compartment located vertically below or substantially near an axis of at least one of said first and second rear drive wheels; and an engine supporting rigid member for supporting said engine thereon, and wherein a rear edge of said engine supporting rigid member extends rearwardly beyond and over top of a substantial portion of said foot supporting surface.

2. The mower of claim 1, wherein a portion of said engine supporting rigid member forms at least a part of an upper wall of said riding platform compartment.

3. The mower of claim 1, wherein said engine supporting rigid member includes an engine deck, and said riding platform compartment includes, in addition to said foot supporting surface, first and second spaced sidewall and a top wall, wherein at least a portion of said first sidewall is disposed between said first rear drive wheel and feet of the standing occupant, and at least a portion of said second sidewall is disposed between said second rear drive wheel and feet of the standing occupant.

4. The mower of claim 1, wherein said rear edge of said rigid member extends rearwardly over at least about one-third of the total length of said foot supporting surface.

* * * * *